(12) United States Patent
Yamada et al.

(10) Patent No.: US 6,639,544 B2
(45) Date of Patent: Oct. 28, 2003

(54) NON-CONTACT TYPE POTENTIOMETER, ACTUATOR, VEHICLE MOUNTED RADAR DEVICE, AND AUTOMOBILE DRIVE CONTROL SYSTEM

(75) Inventors: Yosuke Yamada, Echi-gun (JP); Takeshi Okuda, Shizuoka (JP); Akira Inui, Hikone (JP)

(73) Assignee: Nidec Corporation, Kyoto (JP)

( * ) Notice: Subject to any disclaimer, the term of this patent is extended or adjusted under 35 U.S.C. 154(b) by 74 days.

(21) Appl. No.: 10/107,168

(22) Filed: Mar. 28, 2002

(65) Prior Publication Data
US 2003/0011506 A1 Jan. 16, 2003

(30) Foreign Application Priority Data
Jul. 10, 2001 (JP) .................................. 2001-208654
Feb. 6, 2002 (JP) ...................................... 2002-029005

(51) Int. Cl.$^7$ .................. H01L 43/04; H01L 43/02; G01S 13/88
(52) U.S. Cl. .................. 342/71; 701/41; 338/12; 338/32 H; 342/70
(58) Field of Search .................. 338/12, 324; 342/70, 342/71, 72; 701/41; 180/446

(56) References Cited

U.S. PATENT DOCUMENTS

| 3,777,273 | A | * | 12/1973 | Baba et al. ................ 338/32 H |
| 3,988,710 | A | * | 10/1976 | Sidor et al. ................ 338/32 R |
| 4,293,837 | A | * | 10/1981 | Jaffe et al. ................ 338/32 H |
| 4,395,695 | A | * | 7/1983 | Nakamura ................ 338/32 H |
| 4,423,406 | A | * | 12/1983 | Nakano ................ 338/32 R |
| 4,425,557 | A | * | 1/1984 | Nakamura ................ 338/32 H |
| 4,835,509 | A | * | 5/1989 | Yoshino et al. ................ 338/32 R |
| 6,212,783 | B1 | | 4/2001 | Ott et al. |
| 6,338,015 | B1 | | 1/2002 | Kawagoe et al. |

FOREIGN PATENT DOCUMENTS

| DE | 197 53 775 A | 6/1999 |
| DE | 19955573 A | 5/2001 |
| EP | 0932025 A | 7/1999 |
| FR | 1509388 A | 1/1968 |
| JP | 59-044619 A | 3/1984 |
| JP | 08-049575 A | 2/1996 |
| JP | 10-325863 A | 12/1998 |

* cited by examiner

Primary Examiner—Ian J. Lobo
(74) Attorney, Agent, or Firm—Shinjyu Intellctual Property Firm

(57) ABSTRACT

An actuator, a vehicle mounted radar device, and an automobile drive control system that employ a non-contact type potentiometer to detect a rotation angle of a rotary shaft. The non-contact type potentiometer includes a pair of planar magnets disposed opposite and parallel with respect to each other on a U-shaped magnetic yoke, the polarities of the magnets being arranged such that approximately parallel magnetic fields are formed around a magnetic detection element that is retained on a support shaft connected to a rotary shaft on an actuator, and can freely rotate relative to the stationary member. By rotating the rotary shaft on the actuator, a change in the output from the magnetic detection element occurs, thus allowing a rotation angle of the rotary shaft to be detected.

16 Claims, 8 Drawing Sheets

A–A

C—C

NON-CONTACT TYPE POTENTIOMETER, ACTUATOR, VEHICLE MOUNTED RADAR DEVICE, AND AUTOMOBILE DRIVE CONTROL SYSTEM

BACKGROUND OF THE INVENTION

1. Field of the Invention

The present invention relates to a non-contact type potentiometer, an actuator, a vehicle mounted radar device, and an automobile drive control system. More specifically, the present invention relates to a non-contact type potentiometer that uses a magnetic detection element to detect a rotational angle of a rotary shaft, and an actuator, a vehicle mounted radar device, and an automobile drive control system that employs such non-contact type potentiometer.

2. Description of the Related Art

Potentiometers that use a magnetic detection element such as a Hall element or other similar element to detect a rotational angle of a rotary shaft are known. By using a magnetic detection element, the angle in which the rotary shaft has been rotated can be detected without contact between a detection means and a rotor. Therefore, non-contact type potentiometers that use a magnetic detection element have a longer life than potentiometers that use a contact type rotor position detecting means such as a brush or the like, because the contact type of potentiometers have problems associated with friction caused by contact between the detecting means and the rotor.

In conventional non-contact type potentiometers that employ a Hall element to detect the intensity of the magnetic field generated by a magnet, the intensity of the magnetic field surrounding the Hall element can be altered by altering the distance between the magnet and the Hall element in accordance with the rotation of a rotary shaft. For example, if a magnet is fixed on the outer circumference of a rotor having a rotary shaft and a Hall element is mounted on a stationary member, the distance between the magnet and the Hall element will vary when the rotor is rotated. Thus, based upon the output signals from the Hall element, the angle of rotation of the rotor can be determined.

However, because the lines of magnetic force extend from the magnet such that they diffuse away therefrom, the intensity of the magnetic field around the Hall element is reduced when the distance between the magnet and the Hall element is changed. As a result, the conventional potentiometers described above cannot detect the angle in which a rotor has been rotated with a high degree of precision.

In addition, if the magnet is fixed on the rotor, the intensity and direction of the magnetic field around the Hall element is complexly changed by the rotation of the rotor, therefore, the output signal from the Hall element cannot be directly correlated with the actual angle in which the rotary shaft has been rotated.

SUMMARY OF THE INVENTION

It is therefore an object of the present invention is to improve the precision with which a non-contact type potentiometer detects an angle at which a rotary shaft has been rotated, without increasing the cost thereof.

It is another object of the present invention to provide a highly reliable actuator that employs a non-contact type potentiometer capable of detecting an angle in which a rotary shaft has been rotated with a high degree of precision.

It is yet another object of the present invention to provide a safe automobile drive observation system that employs a non-contact type potentiometer capable of detecting both an angle in which a rotary shaft has been rotated, and obstructions in the road, with a high degree of precision.

It is yet another object of the present invention to provide a safe automobile drive control system that employs a non-contact potentiometer that is capable of both detecting an angle in which a rotary shaft has been rotated with a high degree of precision, and accurately detecting the operation of the accelerator and/or brakes by the driver and thereby control the acceleration and deceleration of the automobile.

The present invention is a non-contact type potentiometer in which a pair of planar magnets are disposed in an opposing and parallel spaced relationship on a stationary member, with the polarities of the magnets being arranged such that approximately parallel magnetic fields are formed around a magnetic detection element that is fixed on a support shaft that can freely rotate relative to the stationary member.

An angle in which a rotary shaft has been rotated can be detected with a high degree of precision because the magnetic detection element is positioned in approximately parallel magnetic fields. Thus, there is very little variation in the magnetic fields, even if the magnetic detection element rotates together with the support shaft.

In addition, the safety and reliability of actuators, vehicle mounted radar devices, and automobile drive control systems can be improved by using this type of non-contact type potentiometer to detect rotational angles of rotary shafts employed in these devices.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

First Embodiment

Figure 1:
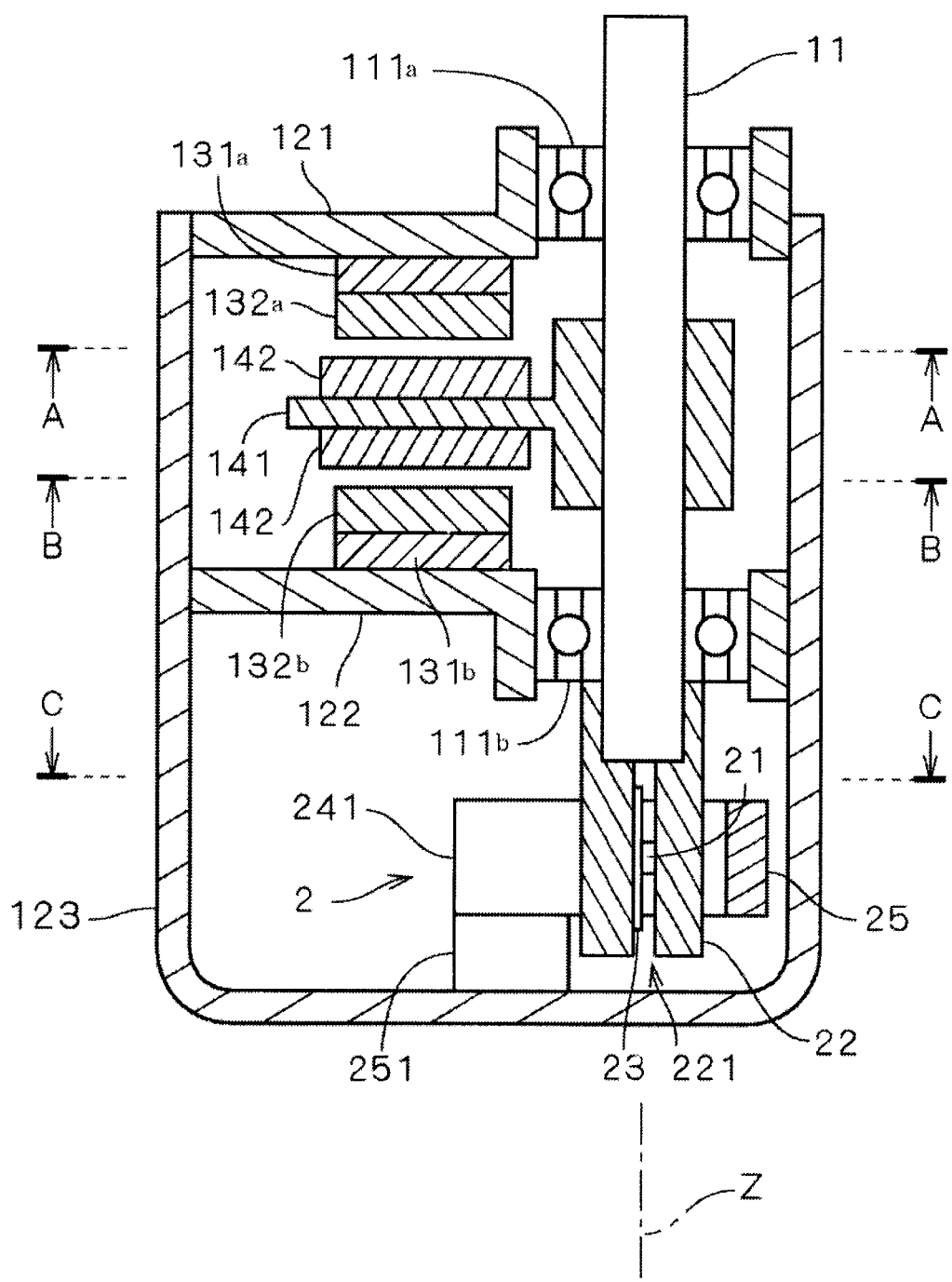
FIG. 1 is a longitudinal cross-sectional view of an actuator according to a first embodiment of the present invention.

FIG. 1 is a longitudinal cross-sectional view showing an actuator 1 having a non-contact type potentiometer 2 according to a first embodiment of the present invention. Note that in FIG. 1, certain components located to the rear of the cross-sectional plane have been omitted for clarity.

The actuator 1 is a device in which a rotary shaft 11 is rotated about an axis Z shown in FIG. 1. The rotary shaft 11 is supported by a pair of bearings 111a and 111b, and can freely rotate thereabout. The bearings 111a and 111b are fixed in apertures formed in an upper support member 121 and a lower support member 122. The upper and lower support members 121, 122 are fitted into a stationary casing 123.

A magnetic plate 131a is fixed to a lower surface of the upper support member 121, and a drive magnet 132a is fixed to a lower surface of the magnetic plate 131a. A magnetic plate 131b is fixed to an upper surface of the lower support member 122, and a drive magnet 132b is fixed to an upper surface of the magnetic plate 131b. An armature core 141 is fixed to the rotating shaft 11 and is positioned between the two drive magnets 132a and 132b. Coils 142 are distributed on the upper and lower surfaces of the armature core 141 so that they oppose the drive magnets 132a and 132b in the axial direction. Note that in FIG. 1, illustration of the lead wires that extend from the coils 142 to the exterior of the casing 123 have been omitted for clarity.

Figure 2:
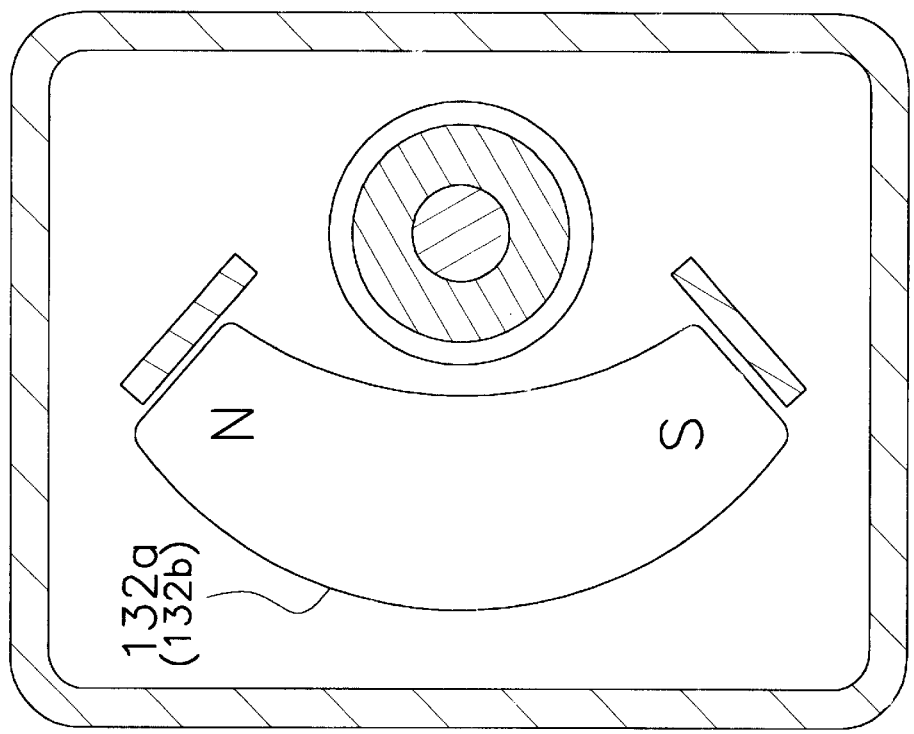
FIG. 2 is a cross-sectional view of the actuator in FIG. 1, taken along line A—A.
Figure 3:
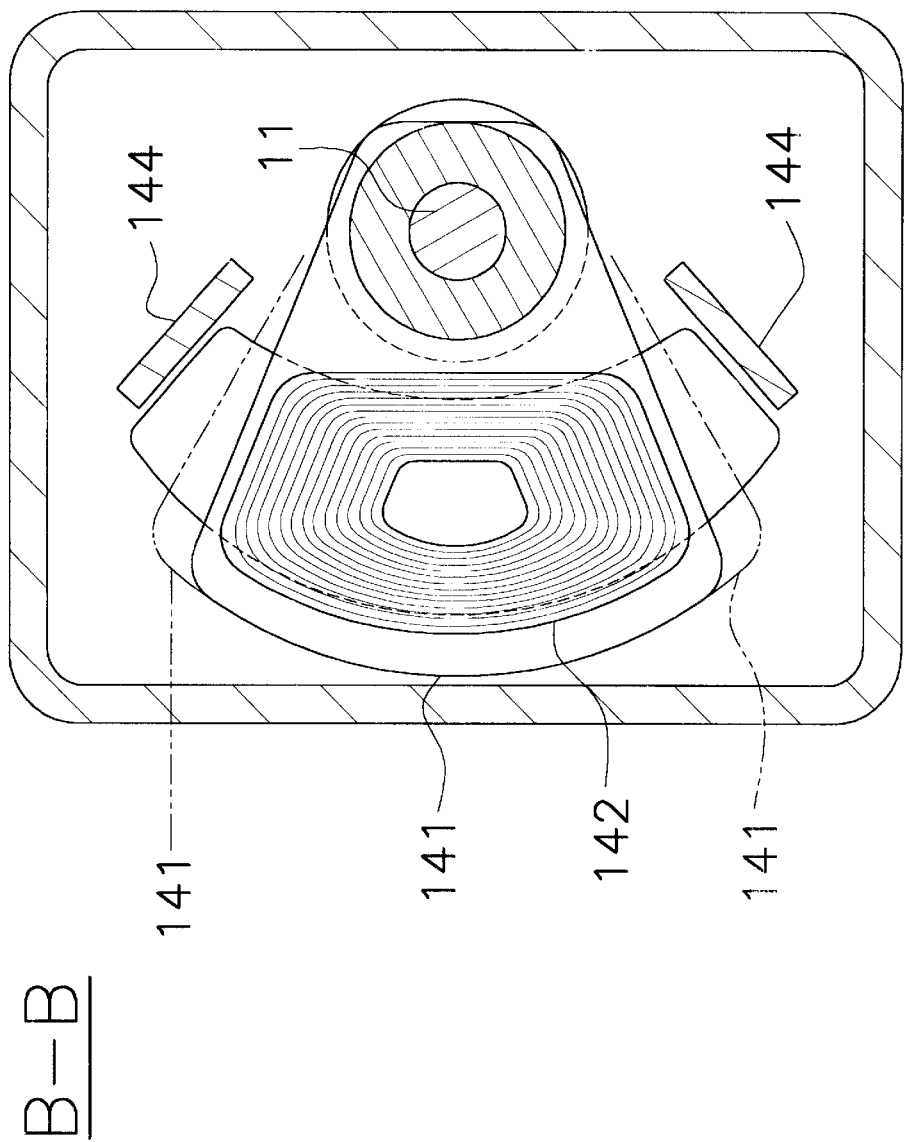
FIG. 3 is a cross-sectional view of the actuator in FIG. 1, taken along the line B—B.

FIG. 2 is a cross-sectional view of the actuator 1 taken along the line A—A shown in FIG. 1, and FIG. 3 is a cross-sectional view of the actuator 1 taken along the line B—B shown in FIG. 1. As shown in FIG. 2, the N and S poles of the drive magnets 132a and 132b are disposed such that they are aligned with the direction in which the armature core 141 is rotated. A horizontal magnetic force can be applied to the armature core 141 by controlling the electric current that is supplied to the coils 142, thus rotating the armature core 141 in a predetermined direction.

Note that the armature core 141 can be rotated in a range of ±7.5° from the state shown in FIG. 3. Note also that the armature core 141 is physically prevented from rotating more than ±15° by stoppers 144.

Figure 4:
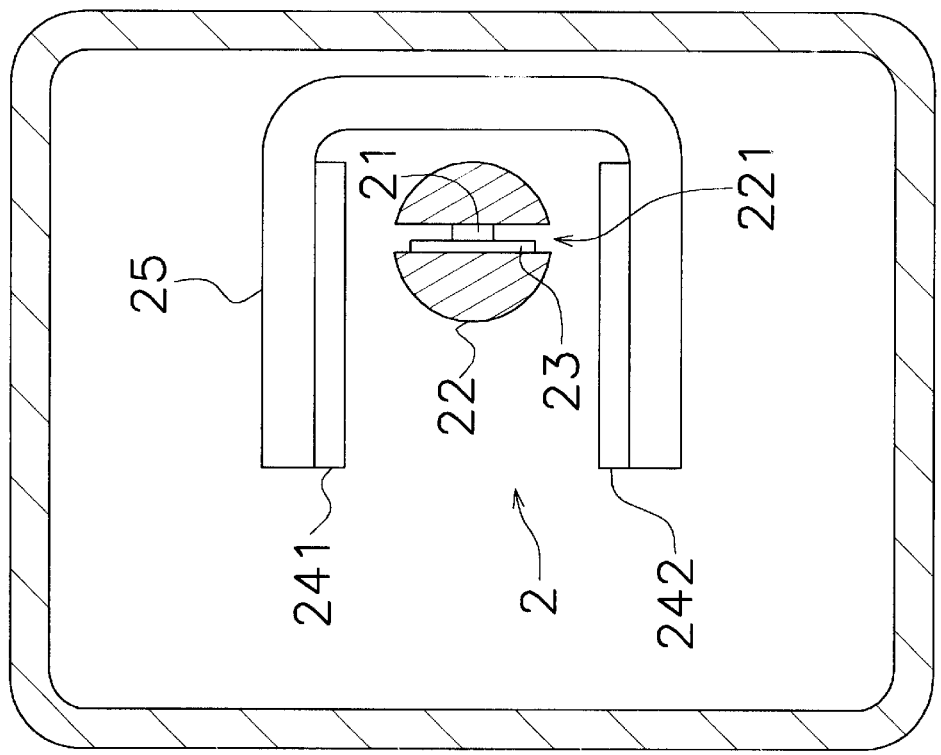
FIG. 4 is a cross-sectional view of the actuator in FIG. 1, taken along the line C—C.

FIG. 4 is a cross-sectional view of the actuator 1 taken along the line C—C of FIG. 1. The potentiometer 2 provided in the actuator 1 will be described below with reference to FIGS. 1 and 4.

A Hall element 21 is arranged in the potentiometer 2 on the rotary shaft 11, and serves to detect magnetism. Specifically, as shown in FIG. 1, a support shaft 22 made by a non-magnetic material such as stainless steel is fixed along the rotational axis of the rotary shaft 11. The support shaft 22 is constructed such that it rotates integrally with the rotary shaft 11. As shown in FIGS. 1 and 4, a slit shaped notch 221 is formed in the support shaft 22, and a circuit board 23 on which the Hall element 21 is mounted is fixed inside the notch 221. In addition, although omitted from the figures, a filler material is placed inside the notch 221 after the circuit board 23 is installed therein. The filler material serves to prevent the circuit board 23 from falling out of the support shaft 22, which can occur when the actuator is operated in extremely cold (e.g., −40° C.) or extremely hot (e.g., +95° C.) environments or when the circuit board 23 is severely vibrated. Note also that in FIGS. 1 to 4, a description of the electric wires that connect to the circuit board 23 has been omitted for clarity.

As shown in FIG. 4, the support shaft 22 is interposed between a pair of magnets 241 and 242 that serve to detect the angle in which the support shaft 22 and the rotary shaft 11 are rotated. The surface of each magnet 241 and 242 that face the support shaft 22 is of mutually opposite polarities. In other words, the N pole and the S pole of the magnets 241 and 242 face each other with the Hall element 21 interposed therebetween. For example, in FIG. 4, the surface of the magnet 241 that faces the support shaft 22 is the N pole, and the surface of the magnet 242 that faces the support shaft 22 is the S pole. This allows approximately parallel magnetic fields to be formed around the Hall element 21. Thus, the rotary shaft 11 will rotate about an axis Z (shown in FIG. 1) that runs perpendicular with respect to the direction of these parallel magnetic fields.

Magnet 241 and magnet 242 are fixed to and are connected together by means of a magnetic yoke 25 that is U-shaped in longitudinal cross-section. The magnetic flux from both magnets 241 and 242 passes through the inside of the magnetic yoke 25, and this configuration increases the strength of the parallel magnetic fields that are formed in and around the support shaft 22. Note also that as shown in FIG. 1, the magnetic yoke 25 is fixed to the casing 123 via an attachment member 251.

Figure 5:
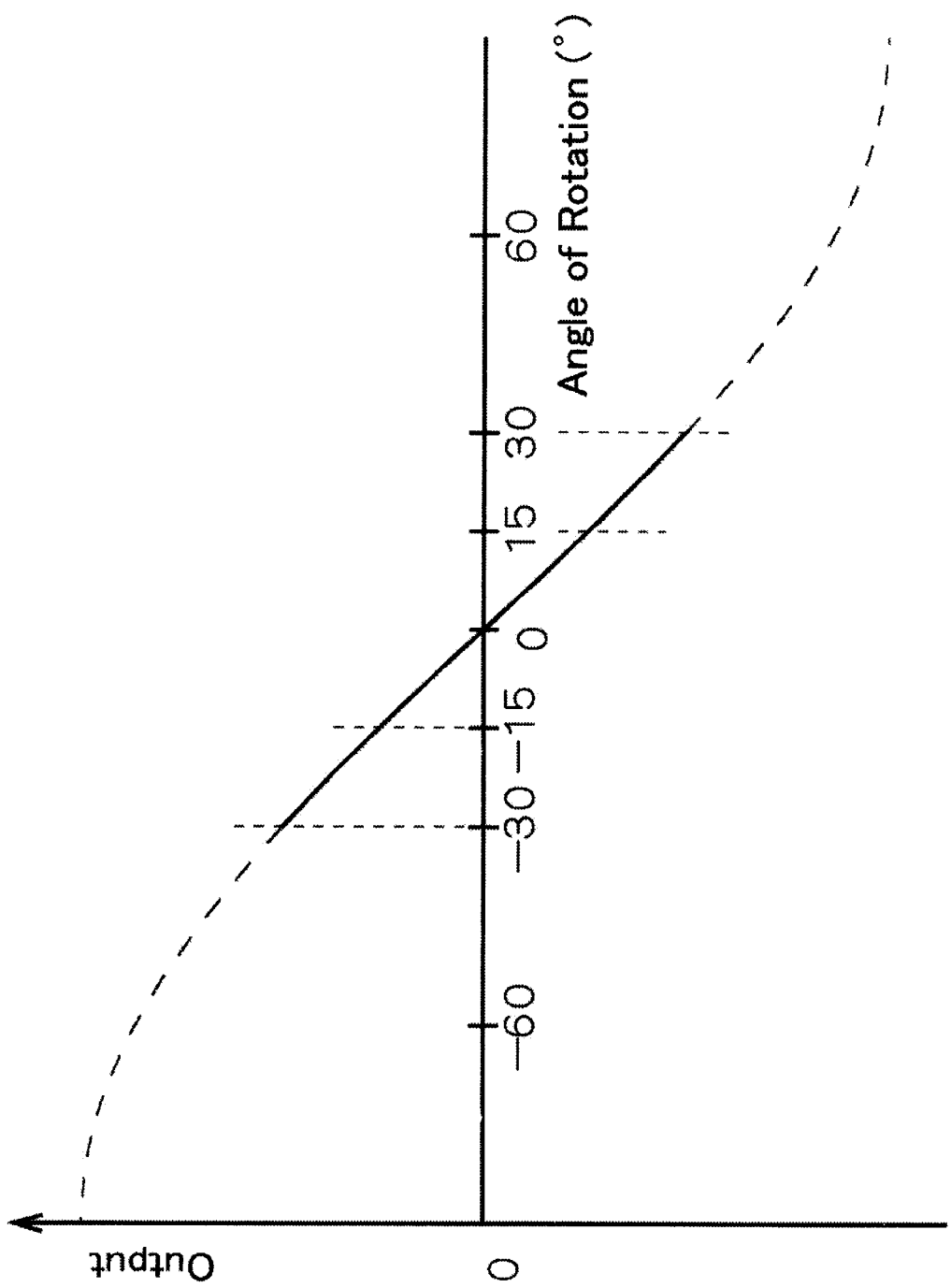
FIG. 5 shows the relationship between the angle of rotation and the output of a Hall element.

Next, the relationship between the output of the Hall element 21 and the rotation of the rotary shaft 11 is described in FIG. 5. The y-axis in FIG. 5 shows the output of the Hall element 21, and the x-axis shows the rotational angle of the rotary shaft 11 with respect to the stationary casing 123. In FIG. 5, when the armature core 141 is in the position shown in FIG. 3, the angle of rotation of the rotary shaft 11 is 0°. Note that the position of the rotary shaft 11 and armature core 141 shown in FIG. 3 will be referred to hereinafter as the "reference position", and as will be further described below, the rotary shaft 11 and the armature core 141 will only be rotated ±7.5°.

The Hall element 21 is secured to the support shaft 22 such that the output thereof will be zero when the rotary shaft 11 and the armature core 141 are in the reference position. In other words, when the rotary shaft 11 and the armature core 141 are in the reference position, the magnetic detection surface inside the Hall element 21 will be parallel with the magnetic flux, and thus no magnetic flux will pass through the magnetic detection surface.

When the rotary shaft 11 and the armature core 141 are rotated, the magnetic detection surface of the Hall element will lean with respect to the reference position. Then, the magnetic flux passing through the magnetic detection surface changes and this causes a change of output voltage of the Hall element 21. The amount of magnetic flux that passes through the magnetic detection surface (or the effective flux, which is the scalar product of the flux density vector and the normal vector on the magnetic detection surface) is proportional to the sine value of the rotational angle in which the rotary shaft 11 is rotated away from the reference position, and the output voltage curve of the Hall element 21 nearly forms a sine wave, as shown in FIG. 5.

The output voltage of the Hall element 21 is zero when the rotational angle of the rotary shaft 11 is 0° (in other words, when the rotary shaft 11 and the armature core 141 are in the reference position). As shown in FIG. 5, the output of the Hall element 21 will change almost linearly along a ±30° range of the shaft rotation. As a result of this linearity, the rotational angle of the rotary shaft 11 can be easily determined with a high degree of precision in connection with the output voltage of the Hall element 21.

In particular, as shown in FIG. 5, when the rotary shaft 11 rotates only within a range of ±15°, the relationship between the output of the Hall element 21 and the angle of the shaft rotation can be considered as linear. Thus, the output from the Hall element 21 need only be multiplied by a coefficient and used as is for the rotational angle of the rotary shaft 11. In fact during actual use, this relationship is even closer to being perfectly linear because the rotary shaft 11 is only rotated ±7.5°. As a result, the rotational angle of the rotary shaft 11 can be easily detected with an even higher degree of precision.

In addition, as shown in FIG. 5, when the rotary shaft 11 and the armature core 141 are in the reference position, the derivative value of the output voltage of the Hall element 21 based on the rotational angle becomes a maximum. Therefore, the rotational angles near the reference position can be detected with a high degree of precision.

The Hall element 21 of the potentiometer 2 is disposed in a strong magnetic field because the N pole and S pole face each other and form parallel magnetic fields around the Hall element 21. Therefore, the potentiometer 2 can detect the rotational angle of the rotary shaft 11 without contact therewith and with a high degree of precision. In addition, when the rotary shaft 11 rotates within a narrow range, the relationship between the output of the Hall element 21 and the rotational angle of the rotary shaft 11 is nearly linear. As a result of the linearity, the rotational angle of the rotary shaft 11 can be more easily detected.

Note that even if the Hall element 21 is slightly out of position, the intensity of the magnetic field surrounding it will not change a great deal because the Hall element 21 is disposed inside of the parallel magnetic fields. Thus, neither the Hall element 21 and the circuit board 23, nor the actuator 1, need be assembled with a high degree of precision.

A number of other advantages are achieved by means of the present invention. For example, the rotating and/or moving parts in the present invention can be made much smaller than they could be in an actuator which the magnets 241 and 242 are fixed on the rotary shaft 11 and the Hall element 21 is secured on the stationary casing 123. This is because the magnets 241 and 242 are fixed on the stationary casing 123, and the Hall element 21 is secured on a support shaft 22 that is integral with the rotary shaft 11. As a result, the inertia of the rotary shaft 11 can be reduced, the rotary shaft 11 can rotate smoothly, and the structure can be simplified and made mechanically quite stable.

Moreover, the Hall element 21 can be prevented from falling off of the potentiometer 2 because the Hall element 21 and the circuit board 23 are installed inside the support shaft 22. Further, the parallel magnetic fields formed by the two magnets 241 and 242 can be reduced to a small area by disposing the Hall element 21 and the circuit board 23 in the vicinity of the axis Z of the rotary shaft 11 (i.e., practically on the Z axis).

It should be noted that the means of detecting magnetism is not limited to the Hall element 21. It will be readily apparent to one of ordinary skill in the art that other types of magnetic detection elements other than a Hall element may be employed in the present invention.

Figure 6:
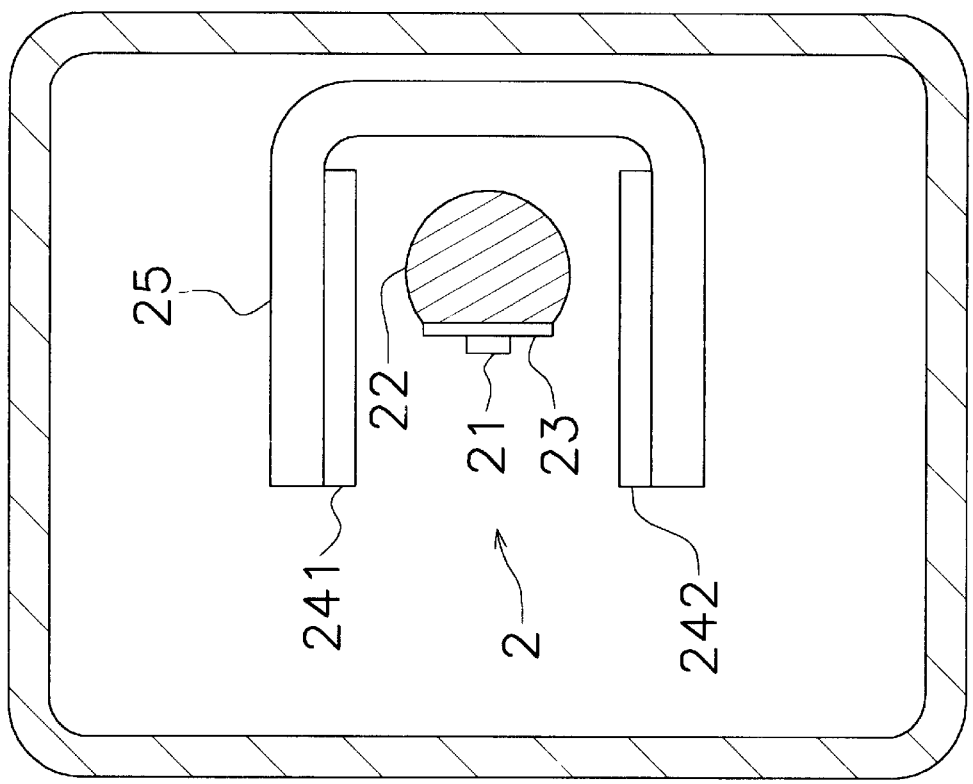
FIG. 6 shows another location in which the Hall element can be secured on a rotary shaft.

It should also be noted that in the first embodiment of the present invention described above, the circuit board 23 having the Hall element 21 mounted thereon is installed inside the support shaft 22. However, the circuit board 23 may also be mounted on the surface of the support shaft 22 in the manner shown in FIG. 6.

Second Embodiment

Figure 7:
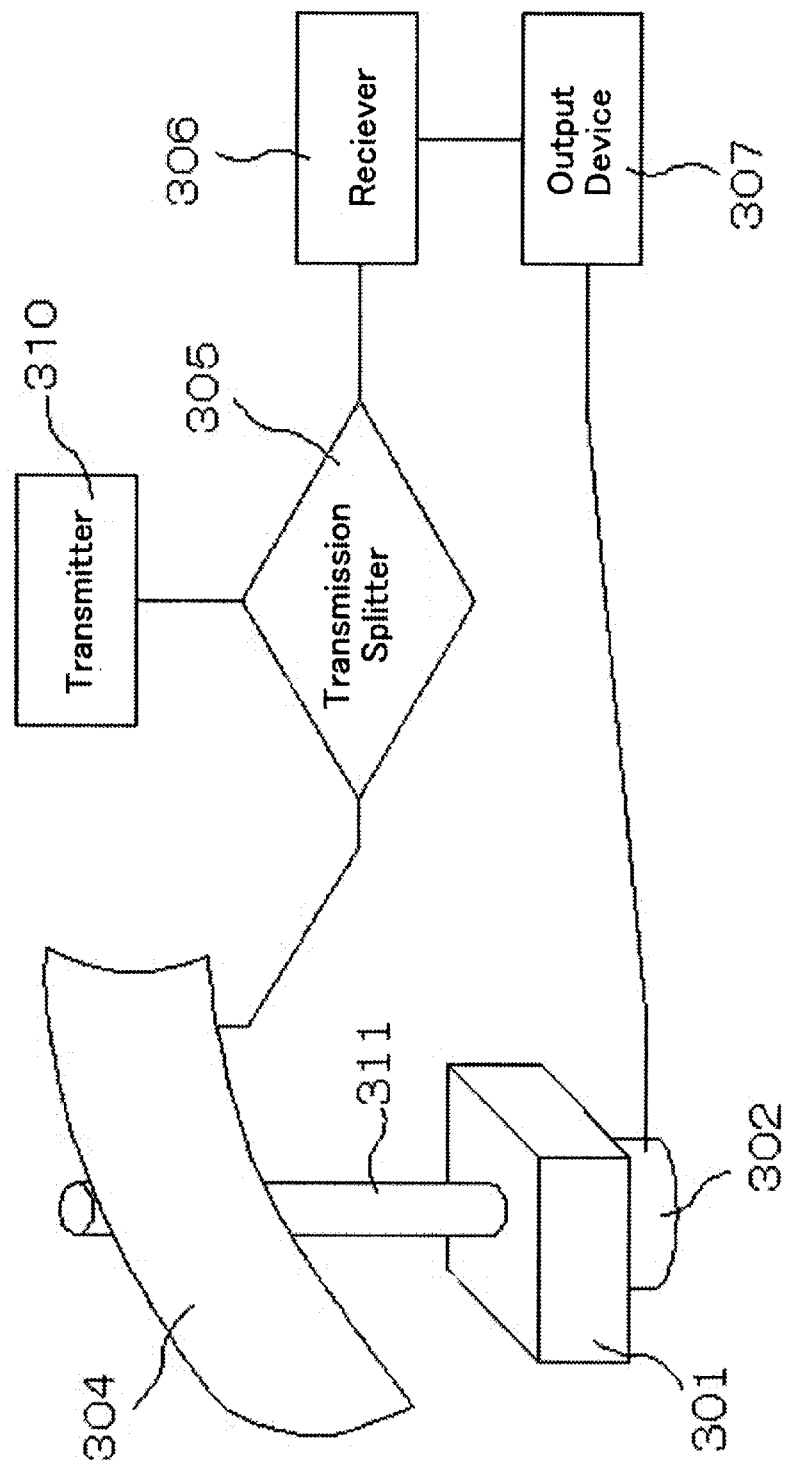
FIG. 7 shows a second embodiment of the present invention, in which an actuator with a non-contact type potentiometer is employed in a vehicle mounted radar device.

FIG. 7 shows a second embodiment of the present invention, in which an actuator 301 and a potentiometer 302 are employed in a vehicle mounted radar device. Note that the actuator 301 and the potentiometer 302 have a configuration that is identical to that of the actuator 1 and the potentiometer 2 in the first embodiment.

A radar paddle 304 receives pulse-type high frequency signals (electromagnetic waves having approximately parallel waveforms) from a transmission splitter 305, simultaneously emits these waves toward a target, receives waves reflected from the target, and then transmits the waves to the transmission splitter 305. The radar paddle 304 is configured such that it is rotated about the axis of a rotary shaft 311 in the actuator 301, and the direction in which the electromagnetic waves are emitted incrementally changes as the waves are being sent and received. The rotary shaft 311 is connected to the potentiometer 302.

The actuator 301 reciprocates the radar paddle 304 left to right within a fixed angular range via the rotary shaft 311. The potentiometer 302 allows the direction in which the radar panel 304 is pointing to be detected at any given moment.

A transmitter 310 transmits pulse-type high frequency waves and sends them to the transmission splitter 305. The transmission splitter 305 receives the high frequency waves from the transmitter 310 and sends them to the radar paddle 304, and simultaneously therewith, separates the reflected signal received by the radar paddle 304 from the transmission signal and sends the reflected signal to a receiver 306. The receiver measures the time interval between the emission of an electromagnetic wave and its reception, and calculates the distance to the object from which it was reflected. The results are sent serially to an output device 307.

The output device 307 receives the distance to the object from the receiver 310, and simultaneously therewith, reads out the direction in which the radar paddle 304 is pointed from the potentiometer 302. The output device 307 relates the direction in which the radar paddle 304 is pointed to the distance from the object, and forms a two-dimensional map.

Note that it is preferable that the electromagnetic waves employed be in the milliwave zone in order to provide a more precise measurement of distance. However, it will be readily apparent to one of ordinary skill in the art that signals which have a shorter wavelength may be used, such as an infrared laser or a laser in the visible light spectrum.

As described above, the potentiometer 302 combines a high degree of precision with a high degree of reliability by disposing a magnetic detection element, such as a Hall element, in a magnetic field formed between a pair of planar magnets, and by detecting the angle in which the rotary shaft 311 is rotated without contact therewith. Moreover, because the potentiometer 302 is relatively inexpensive, a vehicle mounted radar can be inexpensively constructed, yet be highly precise and not require any maintenance during the life of the automobile.

Third Embodiment

Figure 8:
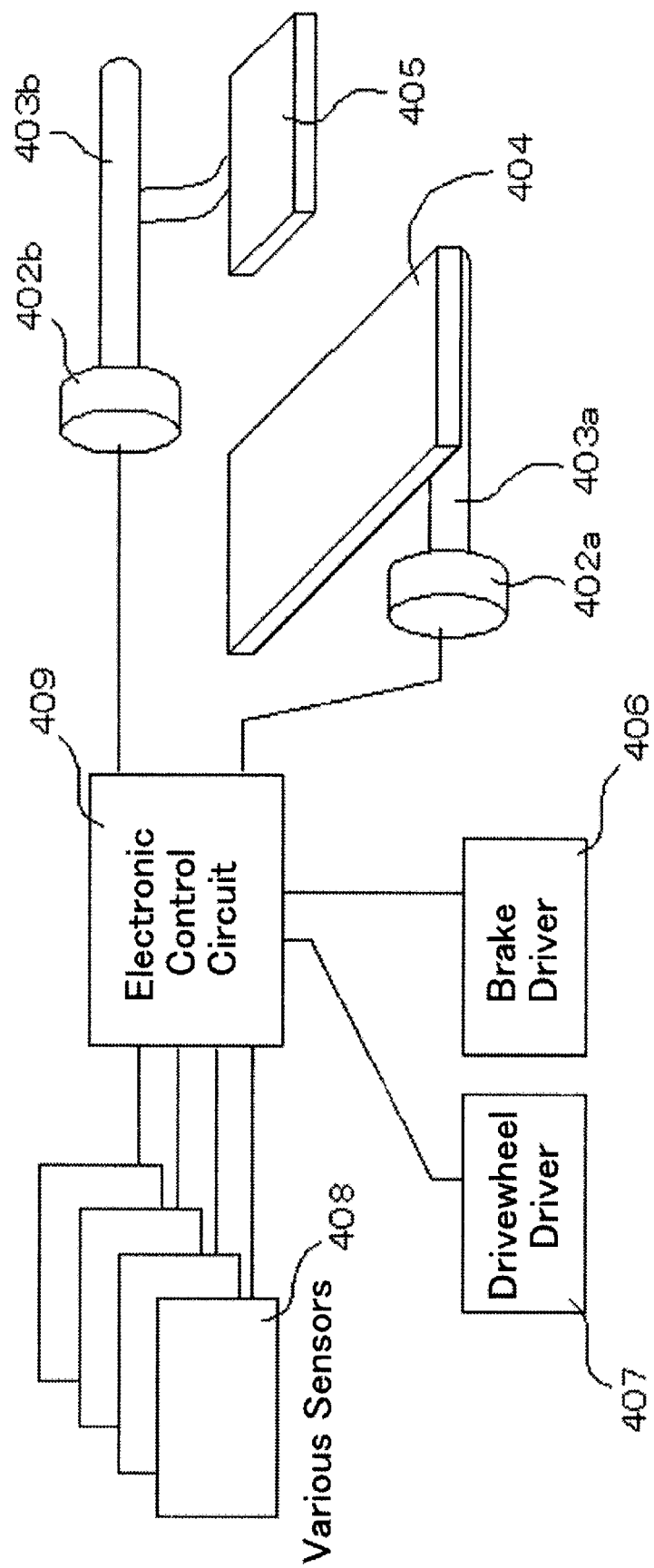
FIG. 8 shows a third embodiment of the present invention, in which a plurality of actuators with non-contact type potentiometers are employed in an automobile drive control system.

FIG. 8 shows a third embodiment of the present invention, in which the potentiometer 2 of the first embodiment is applied to an automobile drive control system that electronically measures the amount that an accelerator and brake pedal of an automobile have been depressed, and employs a control circuit to electronically control the movement of the automobile.

A brake pedal 404 and an accelerator pedal 405 are respectively connected with mounting shafts 403a and 403b, and each of these shafts rotate in response to each pedal being depressed. The angles in which these shafts are rotated are detected by means of potentiometers 402*a* and 402*b* mounted on each shaft, and are converted to electronic signals and output to an electronic control circuit 409.

The electronic control circuit 409 continuously monitors the amount of pressure applied to the brake pedal 404 and the accelerator pedal 405 by means of the potentiometers 402*a* and 402*b*. Simultaneously therewith, a plurality of sensors 408 continuously monitor a number of operating parameters in the automobile, such as engine RPM and the like. The electronic control circuit 409 includes a software program stored therein that controls the operational state of the automobile based upon data supplied from these sensors. When the brake pedal 404 or the accelerator pedal 405 are depressed, the electronic control circuit 409 operates a drive wheel driver 407 or a brake driver 406 in order to produce the appropriate amount of acceleration or braking in response to the drive state of the automobile at that time.

As described above, the potentiometers 402*a* and 402*b* have a Hall element that serves as a magnetic detection element disposed in the magnetic field formed between the pair of planar magnets, and the angles in which the mounting shafts 403*a* and 403*b* are rotated are detected by the potentiometers 402*a* and 402*b* without contact therewith. This allows the potentiometers 402*a* and 402*b* to have a long service life, to be highly precise, and be inexpensive to produce, which in turn allows an inexpensive and highly operable automobile control system to be produced that will not, under normal operating conditions, require maintenance during the life of the automobile.

This application claims priority to Japanese Patent Application Nos. 2001-208654 and 2002-029005, and the entire disclosures thereof are incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided fro illustration only, and not for the purpose of limiting the invention as defined by the appended claims and their equivalents. Thus, the scope of the invention is not limited to the disclosed embodiments.

What is claimed is:

1. A non-contact type potentiometer, comprising:
   a stationary member;
   a pair of planar magnets disposed on the stationary member, the pair of planar magnets spaced in opposite and parallel relationship to one another;
   a support shaft disposed between the pair of planar magnets and capable of relative rotation with respect to the stationary member; and
   a magnetic detection element that is retained on the support shaft;
   wherein the pair of planar magnets are arranged such that approximately parallel magnetic fields are formed around the magnetic detection element.

2. The non-contact type of potentiometer as set forth in claim 1, wherein the pair of planar magnets are retained on a magnetic yoke that is U shaped in cross section and surround the support shaft.

3. The non-contact type of potentiometer as set forth in claim 1, wherein the magnetic detection element is mounted on a circuit board inside a slot formed in the support shaft.

4. The non-contact type potentiometer as set forth in claim 1, wherein the magnetic detection element is secured on the support shaft such that a derivative value of an output of the magnetic detection element is at a maximum at a reference position, the reference position serving as a reference when an angle of rotation of the rotary shaft is detected.

5. An actuator, comprising:
   a casing;
   a rotary shaft that is supported by the casing by means of bearings;
   an armature that is freely rotatable together with the rotary shaft; and
   a non-contact potentiometer that detects an angle of rotation of the rotary shaft and outputs the same, the non-contact potentiometer comprising a pair of planar magnets disposed on the casing and spaced in opposite and parallel relationship to one another, a support shaft connected to the rotary shaft and disposed between the pair of planar magnets; and a magnetic detection element that is retained on the support shaft;
   wherein the pair of planar magnets are arranged such that approximately parallel magnetic fields are formed around the magnetic detection element and are perpendicular to the axis of the rotary shaft.

6. The actuator as set forth in claim 5, wherein the pair of planar magnets are retained on a magnetic yoke that is U shaped in cross section and surround the support shaft.

7. The actuator as set forth in claim 5, wherein the magnetic detection element is mounted on a circuit board inside a slot formed in the support shaft.

8. The actuator as set forth in claim 5, wherein the magnetic detection element is secured on the support shaft such that a derivative value of an output of the magnetic detection element is at a maximum at a reference position, the reference position serving as a reference when an angle of rotation of the rotary shaft is detected.

9. A vehicle mounted radar device, comprising:
   a transmission control device that controls the transmission and reception of radar waves that detect obstructions;
   a radar paddle that is connected to the transmission control device;
   an actuator having a rotary shaft that rotates the radar paddle;
   a non-contact type potentiometer that detects and outputs an angle of rotation of the rotary shaft; and
   a signal processor that calculates predetermined data based upon radar waves received by the radar paddle and output from the potentiometer;
   wherein the non-contact type potentiometer includes a pair of planar magnets spaced opposite and in parallel relationship to one another, a support shaft connected to the rotary shaft and disposed between the pair of planar magnets, and a magnetic detection element that is fixed on the support shaft; and
   the pair of planar magnets are arranged such that approximately parallel magnetic fields are formed around the magnetic detection element and are perpendicular to the axis of the rotary shaft.

10. The vehicle mounted radar device as set forth in claim 9, wherein the pair of planar magnets surround the support shaft, and are retained on a magnetic yoke that is U shaped in cross section.

11. The vehicle mounted radar device as set forth in claim 8, wherein the magnetic detection element is mounted on a circuit board inside a slot formed in the support shaft.

12. The vehicle mounted radar device as set forth in claim 9, wherein the magnetic detection element is secured on the support shaft such that a derivative value of an output of the magnetic detection element is at a maximum at a reference position, the reference position serving as a reference when an angle of rotation of the rotary shaft is detected.

13. An automobile control system, comprising:

a pedal for operating an accelerator or a brake;

a rotary shaft that is connected to the pedal and rotates in response to movement of the pedal;

a non-contact type potentiometer that detects and outputs an angle of rotation of the pedal; and an electronic control circuit that calculates the angle of rotation of the rotary shaft output from the potentiometer, and controls a drive wheel driver or a brake driver;

wherein the non-contact type potentiometer includes a pair of planar magnets spaced in opposite and parallel relationship to one another, a support shaft connected to the rotary shaft and disposed between the pair of planar magnets; and a magnetic detection element that is retained on the support shaft; and the pair of planar magnets are arranged such that approximately parallel magnetic fields are formed around the magnetic detection element and are perpendicular to the axis of the rotary shaft.

14. The automobile control system as set forth in claim 13, wherein the pair of planar magnets are retained on a magnetic yoke that is U shaped in cross section and surround the support shaft.

15. The automobile control system as set forth in claim 13, wherein the magnetic detection element is mounted on a circuit board inside a slot formed in the support shaft.

16. The automobile control system as set forth in claim 13, wherein the magnetic detection element is secured on the support shaft such that a derivative value of an output of the magnetic detection element is at a maximum at a reference position, the reference position serving as a reference when an angle of rotation of the rotary shaft is detected.

* * * * *